United States Patent
Stanfill (10) Patent No.: US 10,628,240 B2
(45) Date of Patent: Apr. 21, 2020

(54) HETEROGENEOUS EVENT QUEUE

(71) Applicant: Ab Initio Technology LLC, Lexington, MA (US)

(72) Inventor: Craig W. Stanfill, Lincoln, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 15/843,605

(22) Filed: Dec. 15, 2017

(65) Prior Publication Data

US 2018/0173577 A1     Jun. 21, 2018

Related U.S. Application Data

(60) Provisional application No. 62/434,472, filed on Dec. 15, 2016.

(51) Int. Cl.
*G06F 9/54* (2006.01)
*G06F 9/48* (2006.01)

(52) U.S. Cl.
CPC ............ *G06F 9/542* (2013.01); *G06F 9/4881* (2013.01); *G06F 9/546* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 6,760,309 B1 | 7/2004 | Rochberger et al. | |
| 7,334,000 B2 | 2/2008 | Chhatrapati et al. | |
| 7,421,273 B2 | 9/2008 | Diepstraten et al. | |
| 8,924,981 B1 * | 12/2014 | Brown | |
| 9,372,730 B1 | 6/2016 | Pulford et al. | |

(Continued)

FOREIGN PATENT DOCUMENTS

| | | |
|---|---|---|
| EP | 1142213 | 11/2005 |
| EP | 2654341 | 10/2013 |

OTHER PUBLICATIONS

Sumathi, R., and R. Srinivasan. 2009. "QoS Aware Routing for End-to-End Reliability of Delay Sensitive Events in Wireless Sensor Networks." In Proceedings of the Fourth International ICST Conference on COMmunication System SoftWAre and MiddlewaRE, 3 pages.

(Continued)

*Primary Examiner* — Syed A Roni
(74) *Attorney, Agent, or Firm* — Occhiuti & Rohlicek LLP (57) ABSTRACT

Processing multiple kinds of event messages in a computing system includes storing the event messages as records associated with event messages. Each event message includes a timestamp and the records include a field indicating a target delivery time for an event result for the event message, the target delivery time being determined according to a kind of the event message. The event messages are processed to deliver event results based on information in the event messages and the target delivery times. Event messages are prioritized to deliver event results according to information indicating priority. A target delivery time is computed for event messages having a same priority based on fixed delays relative to their timestamps. Event results are delivered based on a comparison of their target delivery times to a clock time.

16 Claims, 8 Drawing Sheets

(56) References Cited

U.S. PATENT DOCUMENTS

| | | |
|---|---|---|
| 9,424,075 B1 | 8/2016 | Halim |
| 2002/0107743 A1 | 8/2002 | Sagawa |
| 2006/0277330 A1 | 12/2006 | Diepstraten et al. |
| 2012/0082156 A1* | 4/2012 | Swartzentruber |
| 2014/0032671 A1 | 1/2014 | Chhatrapati et al. |

OTHER PUBLICATIONS

D. Locke, L. Sha, R. Rajikumar, J. Lehoczky, and G. Burns. 1988. Priority inversion and its control: An experimental investigation. In Proceedings of the second international workshop on Real-time Ada issues (IRTAW '88), J. Barnes (Ed.). ACM, New York, NY, USA, 39-42.

Robert Rönngren, Rassul Ayani, Richard M. Fujimoto, and Samir R. Das. 1993. Efficient implementation of event sets in Time Warp. In Proceedings of the seventh workshop on Parallel and distributed simulation (PADS '93), Rajive Bagrodia and David Jefferson (Eds.). ACM, New York, NY, USA, 101-108. DOI=http://dx.doi.org/10.1145/158459.158472.

Mohsin Iftikhar, Bjorn Landfeldt, and Mine Caglar. 2007. Traffic engineering and QoS control between wireless diffserv domains using PQ and LLQ. In Proceedings of the 5th ACM international workshop on Mobility management and wireless access (MobiWac '07). ACM, New York, NY, USA, pp. 120-129.

Tamás Bérczes, Béla Almási, Attila Kuki, János Sztrik, and Revaz Kakubava. 2013. Modeling the performance and the energy usage of wireless sensor networks by retrial queueing systems. In Proceedings of the 8th ACM workshop on Performance monitoring and measurement of heterogeneous wireless and wired networks (PM2HW2N '13). ACM, New York, NY, USA, 133-138.

K. Bruce Erickson, Richard E. Ladner, and Anthony Lamarca. 2000. Optimizing static calendar queues. ACM Trans. Model. Comput. Simul. 10, 3 (Jul. 2000), pp. 179-214.

* cited by examiner

| class | pri | dt | re |
|---|---|---|---|
| Real Time | A | now() | F |
| Near Real Time | B | ts + Δ | T |
| NRT Alarm | C | ts | T |
| Batch Alarm | D | ts | T |
| Scheduled Batch | E | next_window() | F |
| Unscheduled Batch | Z | now() | F |

HETEROGENEOUS EVENT QUEUE

CROSS-REFERENCE TO RELATED APPLICATIONS

This application claims priority to U.S. Application Ser. No. 62/434,472, filed on Dec. 15, 2016, which is incorporated herein by reference.

BACKGROUND

This description relates to an event queue for processing events with heterogenous characteristics.

Data processing systems often deal with many different kinds of input events. For example, in a telecommunications domain, some events may have "real-time" characteristics, for example, relating to the setup, routing, and/or tear-down of telephone calls. Some events may be "near real-time", for example, related to call record handling, for example, occurring once per call. Other events may be less frequent, for example, related to billing or periodic maintenance tasks. Together, these input events may constitute massive flows that must be processed, all the while providing adequate response for particular kinds of events (e.g., near real-time event).

One approach to designing a system that deals with such heterogeneous inputs is to have separate software and/or hardware structures dedicated to different of these kinds of input, thereby enabling different types of processing that is appropriate for the different kinds. Some examples of different types of processing may differ in whether events should be processed as quickly as possible, be processed in the order they were generated to ensure proper business logic, or be processed at a low priority to avoid steeling computation resources from higher priority tasks.

There is a cost to maintaining separate software and/or hardware structures, for example, due to the human cost of maintaining complex systems, as well as a technological cost resulting from potential under-utilization of dedicated resources.

SUMMARY

In a general aspect, an approach to handling heterogeneous event inputs to a system makes use of an integrate queue structure, which is able to handle massive flows of input events while providing the needed response to particular kinds of events (e.g., near real-time events). The queue structure includes a combination of features, including multiple features of (a) prioritization of events, for example, by associating different kinds or classes of events with different priority levels, (b) deferred delivery of events, for example according to rule-based delivery-time computation, which may depend on the kind or class of an event, and (c) reordering of events, for example, according to their origination times optionally constrained by key values in the events. To support one or more of these features, the queue structure includes a storage for records for events (e.g., ta table) with fields (e.g., columns) with that include or refer to a priority and/or a deferred delivery time valued determined by rule from the kind of event being stored. This arrangement of the storage provides a way to process the events in a manner that requires fewer operations and/or more effective use of storage than would be possible with a conventional approaches (e.g., with using a separate queue for each kind of message). Furthermore, the approach allows for more flexibility in configuring the system, for example, when a new kind of event must be processed, because a new queue for that kind of event is not required to be introduced into the system.

In some examples, this integrated queue structure is used as the input to an event processing system, which may be configured to process a massive flow of events while maintaining near real-time performance for at least some kinds of events. Through the use of the selected features (e.g., (a)-(c) above), the queue structure improves event processing technology by providing efficient processing of a wide variety of kinds of events, while maintaining high utilization of computation resources. Note that the improvement in processing stems from the functionality introduced by the queue structure and the associated procedural steps, and not merely by virtue of being performed by a computer on tasks which computers are used in their ordinary capacity. Furthermore, the approach is not a mere automation of the way a person would conventionally organize and process events should the person have sufficient capacity to handle a flow of events to be processed.

In one particular aspect, in general, a method is applied to processing event messages in a computing system. The method includes storing received event messages in a data storage system. The data storage system includes storage for a first plurality of records associated with event messages, where each event message includes a timestamp, and records associated with event messages include a field indicating a target delivery time for an event result for the event message, the target delivery time for at least some event messages being determined according to a kind of the event message. The stored event messages are processed to deliver event results based on information in the stored event messages and the target delivery times associated with the event messages, the processing. This processing includes prioritizing event messages to deliver event results according to information stored in the event messages indicating priority, computing a target delivery time for each event message in a first set of one or more event messages that store information indicating the same priority for all of the event messages in the first set based on a fixed delay relative to its respective timestamp, and delivering event results for event messages that are deliverable based on a comparison of their target delivery times to a clock time.

Aspects may include one or more of the following features.

The processing further includes reordering a second set of event messages containing fewer than all of the stored event messages to process event messages in the second set of event messages according to the timestamps in the event messages instead of processing event messages in the second set of event messages according to an order in which those event messages were received.

The target delivery time associated with a particular event message is computed after the particular event message is received using a function that is defined at least in part by information included in the particular event message. For instance, for event messages associated with a first event class, the function returns a target delivery time that is based on the clock time.

Event messages associated with the first event class are not in the second set that is reordered, and are processed according to the order in which those event messages were received.

For event messages associated with a second event class of lower priority than the first event class, the function returns a target delivery time that is a sum of the fixed delay and a timestamp in the event message.

Event messages associated with the second event class are in the second set that is reordered, and are reordered according to timestamps stored in the event messages associated with the second class.

For event messages associated with a third event class of lower priority than the second event class, the function returns a target delivery time that is based on a timestamp stored in the event message.

Event messages associated with the third event class are in the second set that is reordered, and are reordered according to timestamps stored in the event messages associated with the third class.

For event messages associated with a third event class of lower priority than the second event class, the function returns a target delivery time that is based on a repeating schedule.

The second set includes event messages that all include a common key value.

Prioritizing event messages to deliver event results according to information stored in the event messages includes storing event messages associated with event classes of different priorities in different respective ordered queues, and selecting a next event message to evaluate for potential delivery of an event result from the front of an ordered queue of the highest priority that is not empty.

In another aspect, in general, software is stored in a non-transitory form on a computer-readable medium, for processing event messages in a computing system. The software includes instructions for causing the computing system to: store received event messages in a data storage system, the data storage system including storage for a first plurality of records associated with event messages, where each event message includes a timestamp, and records associated with event messages include a field indicating a target delivery time for an event result for the event message, the target delivery time for at least some event messages being determined according to a kind of the event message; and process the stored event messages to deliver event results based on information in the stored event messages and the target delivery times associated with the event messages, the processing including: prioritizing event messages to deliver event results according to information stored in the event messages indicating priority, computing a target delivery time for each event message in a first set of one or more event messages that store information indicating the same priority for all of the event messages in the first set based on a fixed delay relative to its respective timestamp, and delivering event results for event messages that are deliverable based on a comparison of their target delivery times to a clock time.

In another aspect, in general, a computing system for processing event messages, the computing system includes: a data storage system for storing received event messages, the data storage system including storage for a first plurality of records associated with event messages, where each event message includes a timestamp, and records associated with event messages include a field indicating a target delivery time for an event result for the event message, the target delivery time for at least some event messages being determined according to a kind of the event message; and at least one processor configured to process the stored event messages to deliver event results based on information in the stored event messages and the target delivery times associated with the event messages, the processing including: prioritizing event messages to deliver event results according to information stored in the event messages indicating priority, computing a target delivery time for each event message in a first set of one or more event messages that store information indicating the same priority for all of the event messages in the first set based on a fixed delay relative to its respective timestamp, and delivering event results for event messages that are deliverable based on a comparison of their target delivery times to a clock time.

In another aspect, in general, a computing system for processing event messages includes: means for storing received event messages and storing a first plurality of records associated with event messages, where each event message includes a timestamp, and records associated with event messages include a field indicating a target delivery time for an event result for the event message, the target delivery time for at least some event messages being determined according to a kind of the event message; and means for processing the stored event messages to deliver event results based on information in the stored event messages and the target delivery times associated with the event messages, the processing including: prioritizing event messages to deliver event results according to information stored in the event messages indicating priority, computing a target delivery time for each event message in a first set of one or more event messages that store information indicating the same priority for all of the event messages in the first set based on a fixed delay relative to its respective timestamp, and delivering event results for event messages that are deliverable based on a comparison of their target delivery times to a clock time.

Aspects can include one or more of the following advantages.

Processing events with substantially different characteristics related to priority and delivery time or delay requirements (i.e., a heterogeneous set of events) in a single queue structure avoids the need for a separate queue for each type of event. Furthermore, when processing events that are output from the queue consume shared resources (e.g., compute resource), the order and time of dequeuing the events serves to schedule, allocate, and/or prioritize the use of the shared resources. For example, delay insensitive events (e.g., "batch" processing events) can be processed in the same queue as low-latency (e.g., "real-time" events) while maintaining high utilization of the shared resources needed to process the events.

Other features and advantages of the invention will become apparent from the following description, and from the claims.

DESCRIPTION

Figure 1:
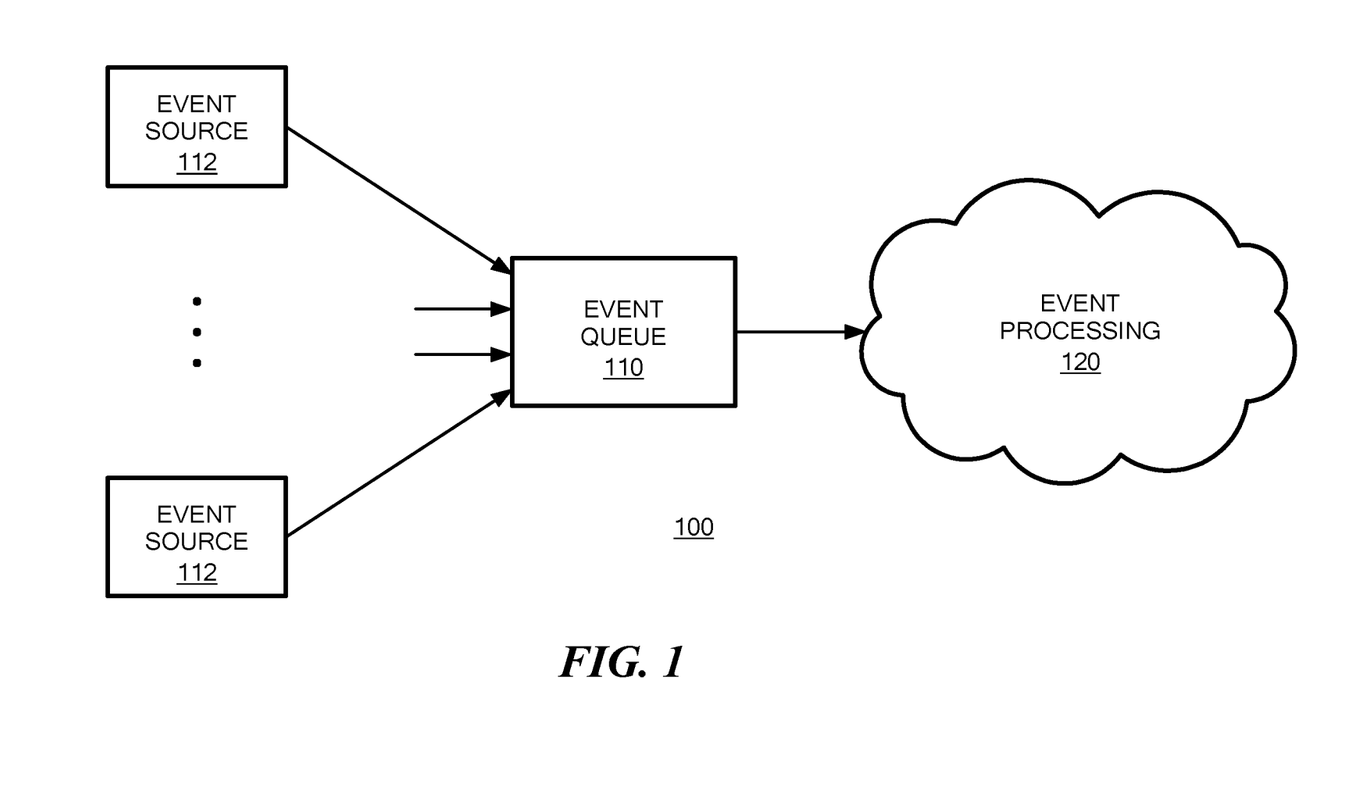
FIG. 1 is a block diagram of an event processing system that includes an event queue that receives a heterogeneous set of input events, and provides these events to an event processing engine.

FIG. 1 shows an example of a data processing system 100 in which a set of event sources 112 provide (e.g., produce)

events that are processed by the system. In the system 100, the produced events are provided to an event queue 110, which accepts different kinds of events from the sources 112. For example, each event source 112 may provide a different kind of event, or certain sources may each provide multiple kinds of events. In any case, the event queue 110 processes the different kinds of events, and provides them for processing by an event processing environment 120. As introduced above, in a telecommunications example, one event source 112 may provide real-time events related to call setup, routing, and tear-down, while another event source 112 may provide call record events, while yet another event source 112 may provide billing events, which have much lower priority and delay requirements that the real-time events.

Figure 2:
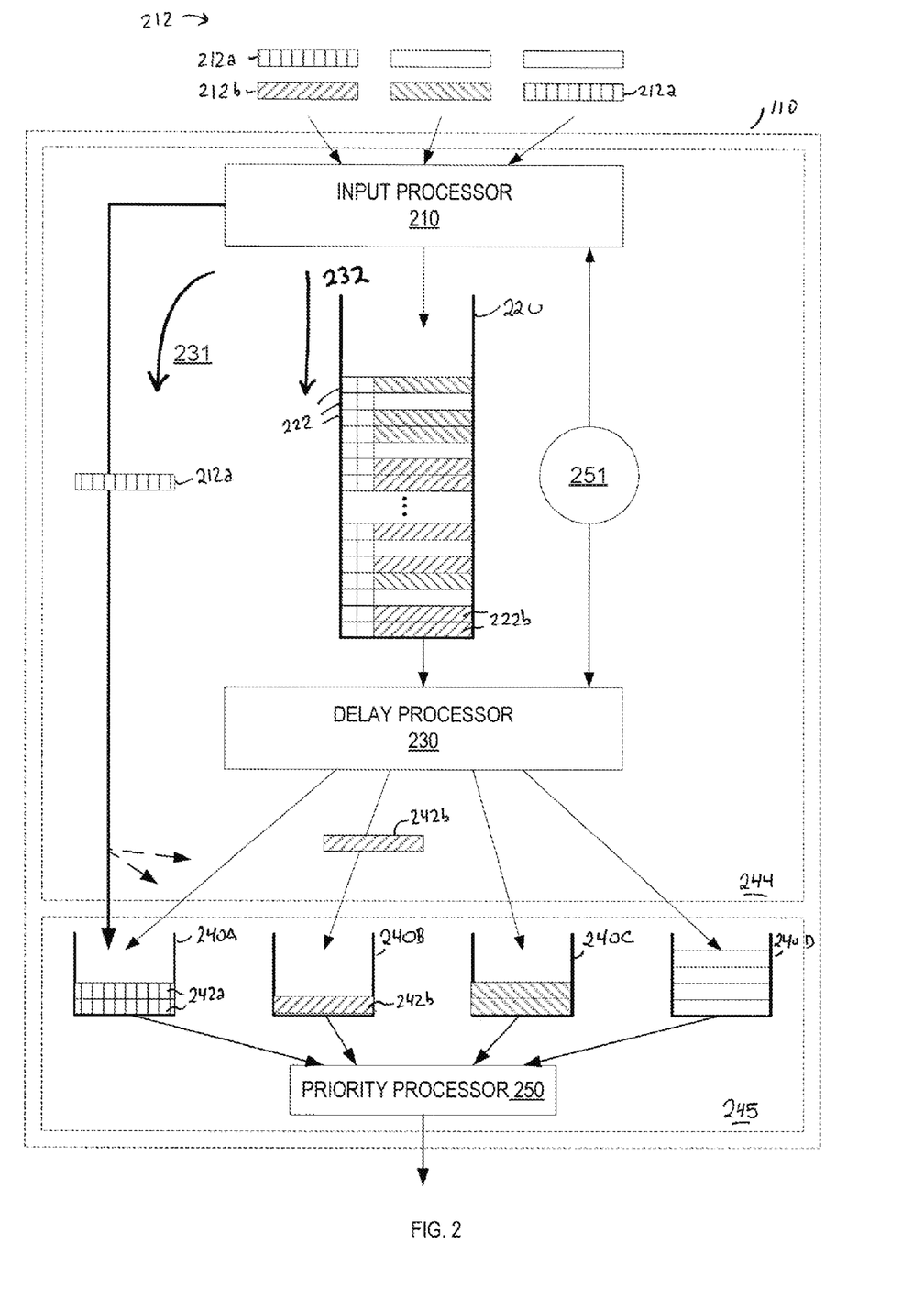
FIG. 2 is a block diagram of an embodiment of the event queue of FIG. 1.

Referring to FIG. 2, an implementation of the event queue 110 of FIG. 1 internally generally makes use of two stages of processing, represented as a first stage 244 and a second stage 245. In the first stage 244 of processing, an input processor 210 receives events 212, for example, as data records on communication links from the event sources, or as parameters in a call to an input methods in the case of an object-oriented software implementation of the event queue. As introduced above, these events may come from multiple different source 112, and each source may provide events 212 that are homogeneous (i.e., all of a same type) or may provide events that are heterogeneous (i.e., events of various types). In FIG. 2, events of different types are illustrated with different cross-hatching, such that an event 212a is of a different type than event 212b.

As is discussed more fully below, the events include timestamps that are typically indicative of a time the event was generated. The events may also be referred to as "messages" or "records" in certain contexts, with the term "event" being used in view of the presents of time stamps in the data representations. Generally, in the first stage of processing, the follow of events can follow either a direct path (illustrated with arrow 231), or a deferred path (illustrated by arrow 232). In the deferred path, certain events are identified as being suitable for deferred delivery by the input processor, which assigns a delivery time to each such event such that the event is not delivered from the event queue 110 until after that delivery time has elapsed. Events 222 that have been assigned delivery times that have not yet been reached are maintained in a queue 220, referred to as the "delay queue." In an implementation, the events in the queue 220 are sorted such that the event 222 with the earliest delivery time is at the head of the queue. This delay queue may hold a large number of events 220, and the nature of these events tolerating deferred delivery provides time for steps such as the sorting by delivery time. A delay processor 230 makes use of a clock 251, which provides a time reference to both the input processor 210 and the delay processor, which determines when to dequeue an event 222 from the delay queue because the time provided by the clock 251 is equal to or later that the assigned delivery time of the event at the head of the delay queue. By way of illustration, two input events 212b received by the input processor are shown having been queued as events 222b in the delay queue, here illustrated at the head of the queue because their delivery time is the earliest in the queue.

The second stages 245 of the event queue 110 makes use of a priority queue 245. In one implementation, each priority of a discrete set of priorities (illustrated as a highest priority A through a lowest priority Z) has a separate queue of a set of queues 240A-Z. Events enter this second stage either by a direct path 231, for example, illustrated as event 212a on the path 231, in the case that the input processor 210 determined that the event was not suitable for deferred delivery. For events that pass from the input processor 210 via the deferred path 232, and are queued in the delay queue 220, in this implementation, the delay processor 230 enqueues each event 242 for which the delivery time has elapsed into the appropriate queue 240A-Z based on the event's priority. For instance, an event 242b corresponding to an input event 212b and a queued event 222b is illustrated passing to a queue 240B. A priority processor 250 dequeues the events 242 from the queues 240A-Z by choosing the highest priority queue that has any pending events 242, and dequeues the event at the head of that queue. The output of the event queue 110, which may be referred to as event results, may be a communication link over which the event is passed. In an object-oriented implementation, the process of dequeuing events from the queues 240A-Z may be performed during execution of an output method of the event queue object. In some implementations, the processing by the delay processor may also be performed as part of execution of the output method of an object-oriented implementation of the event queue, or may be implemented based on a periodic timer "interrupt" that sorts the events 222 of the delay queue 220, and passes those events 222 with elapsed delivery times to the appropriate queues 240A-Z based on their priority.

As introduced above, certain events 212 accepted by the input processor 210 do not require or are not suitable for any delay or deferred delivery. Such events are passed by the input processor 210 via the direct path 231 directly to an appropriate queue 240A-Z according to a priority determined by the input processor.

Figure 3:
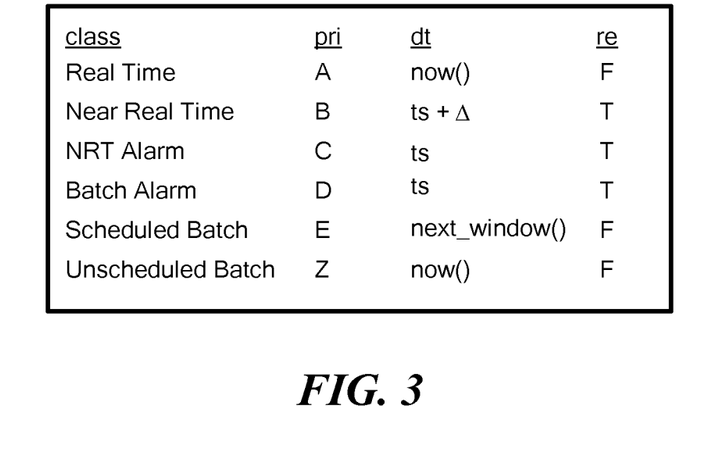
FIG. 3 is a table showing rules implemented by an example of an input processor of the event queue shown in FIG. 2.

Referring to FIG. 3, an example of a set of classes, and the rules for assigning their priority (denoted pri) and delivery time (denoted dt), for example according to their timestamp (denoted ts), is shown in a table. In this example, a first class of events, called "real time" is assigned the highest priority (A). The delivery time is assigned to the current time (now( )), which means that there is no extra delay for an event from such a class. Referring back to FIG. 2, the input processor 210 passes such an event directly to the highest priority queue 240A of the priority queue 245. A second class, "near real-time" is assigned the second highest priority (B). A feature of events of this class is that they may arrive in a different order than their timestamps, but it is desirable to have then delivered in order. A way to address this out-of-order arrival of these events is for the input processor 210 to assign a delivery time as the timestamp plus a longest typical delay (denoted delta) between the timestamp and the time (according to the clock 260) of the arrival of the event (i.e., dt=ts+delta). In this way, the events of this near real-time class that take less than delta to be delivered to the event queue will be delivered to the priority queue 245, and then from the event queue 110, in the order of their timestamps. Note that if some event is delayed more than delta before arriving at the event queue 110, it may not be delivered in ts order from the event queue 110, and therefore this approach handles most of the cases of out-of-order arrival but does not absolutely guarantee in-order output from the event queue. However, such an in-order output cannot be guaranteed if the input delay is can be very large without causing a commensurate delay of all events in that class.

In FIG. 3, three other classes are also shown as not requiring deferred delivery, with each having a different priority. These classes are "near real-time (NRT) alarm" at priority C, "batch alarm" at priority D, and "unscheduled batch" at priority Z. The input processor 210 passes these events directly to the priority queue 245 without passing through the delay queue 220.

Finally, a "scheduled batch" queue has a priority E, but is deferred until a processing time next_window( ), for example, the next midnight after the current time. Events of such a class are held in the delay queue 220 until that delivery time elapses, and then passed by the delay processor 230 to the queue 240E of the priority queue 245.

Figure 4:
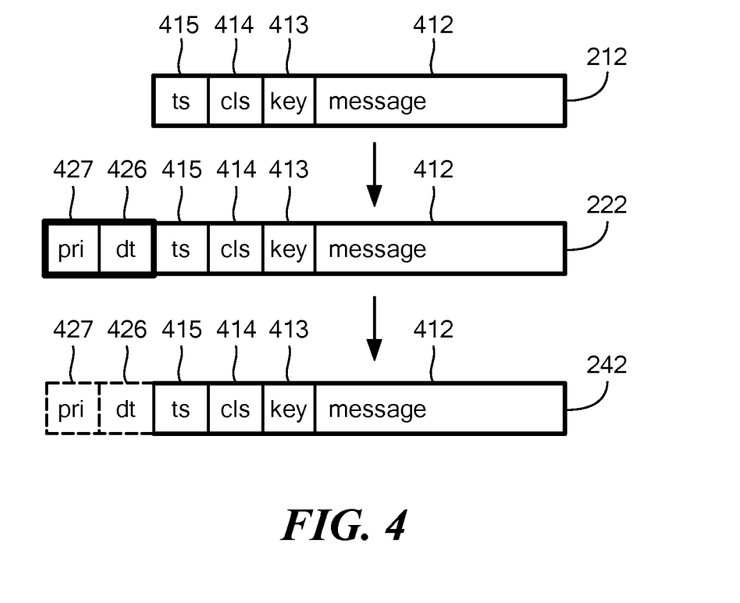
FIG. 4 is a block diagram of a distributed event processing system making use of a distributed event queue.

Referring to FIG. 4, one possible set of structures of the events passing through the event queue is illustrated. In this example, each input event 212 to the event queue 110 has a set of fields: a message 412 holds the "payload" of the event, for example, itself having a set of fields representing the message; a key 413, which may be considered as one of the fields of the message, which is treated specially for certain reordering operations that are described more fully below; a class, denoted cls 414, for example representing the designation "real time", etc.; and the timestamp, ts 415, for the event assigned by the source of the event. When the input processor 210 receives an input event 212, it augments the event to form a structure 222. In particular, the input processor adds the delivery time, dt 426, and the priority, pri 427, for example, according to the rules illustrated in FIG. 3. After an event is dequeued from the delay queue 220 by the delay processor, an event 242 is placed in the priority queue. The priority, pri 427, and delivery time, dt 426, may be omitted because the priority is implicit by the queue 240A-Z the event is placed in, and the deliver time is guaranteed to have already passed.

In an optional processing of the events 242 in the queues 240A-Z, messages may be further reordered according to a number of constraints. One constraint is that the events for the class are permitted to be reordered. For example, the rules shown in FIG. 3 for the input processor 210 may indicate that a "real time" class may not be reordered (re=F), while a class "near real-time" may be reordered (re=T). In some embodiments, the reordering may be subject to a requirement that events in a particular queue (say 240B) may be delivered in any order, subject to the requirement that events with the same value of key must remain in a prescribed order (e.g., in ts order, or in the order they arrived at the event queue 110). One optional implementation for a class for which re=F is for the priority processor 250 to take the event which has the lowest ts and no earlier delivered events with the same ts. One optional implementation for a class for which re-T is for the priority processor 250 to deliver the event with the earliest ts overall in each queue 240A-Z.

Figure 5A:
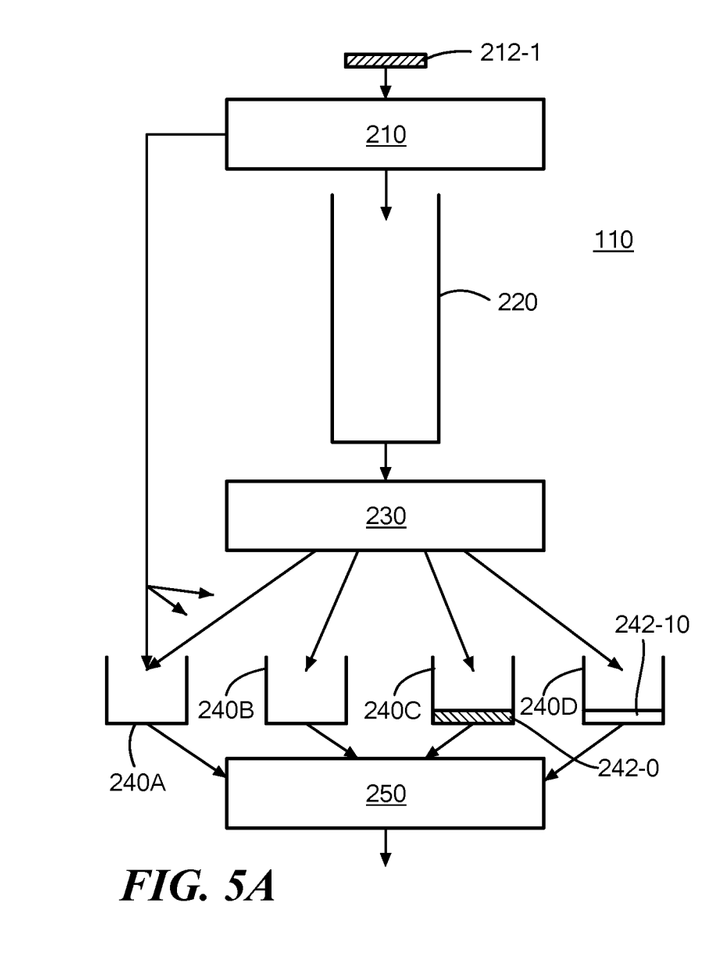
FIGS. 5A-H are block diagrams corresponding to FIG. 2 showing processing of a series of events.
Figure 5B:
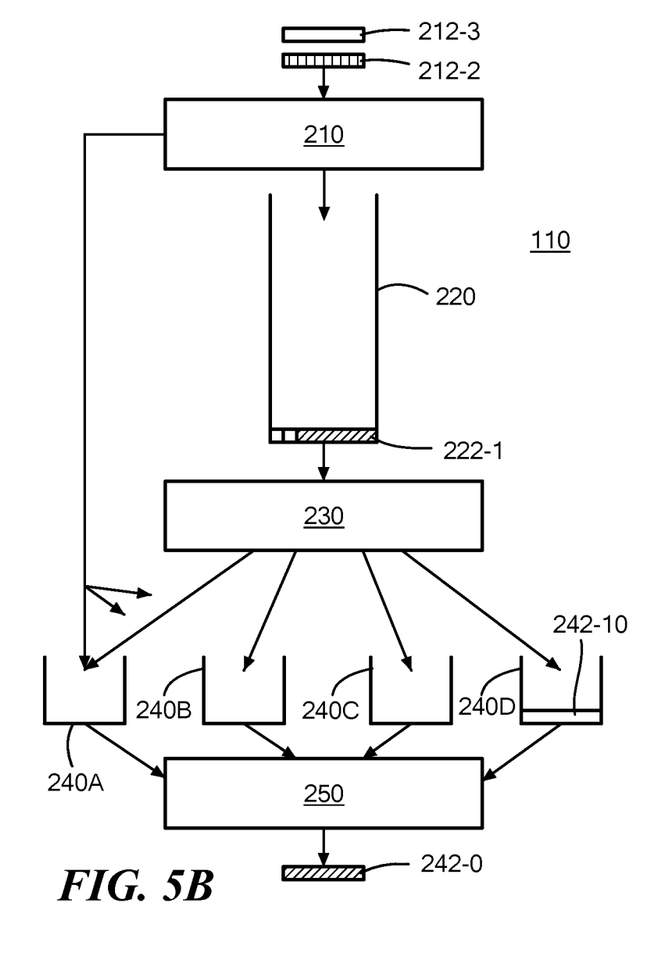
Figure 5C:
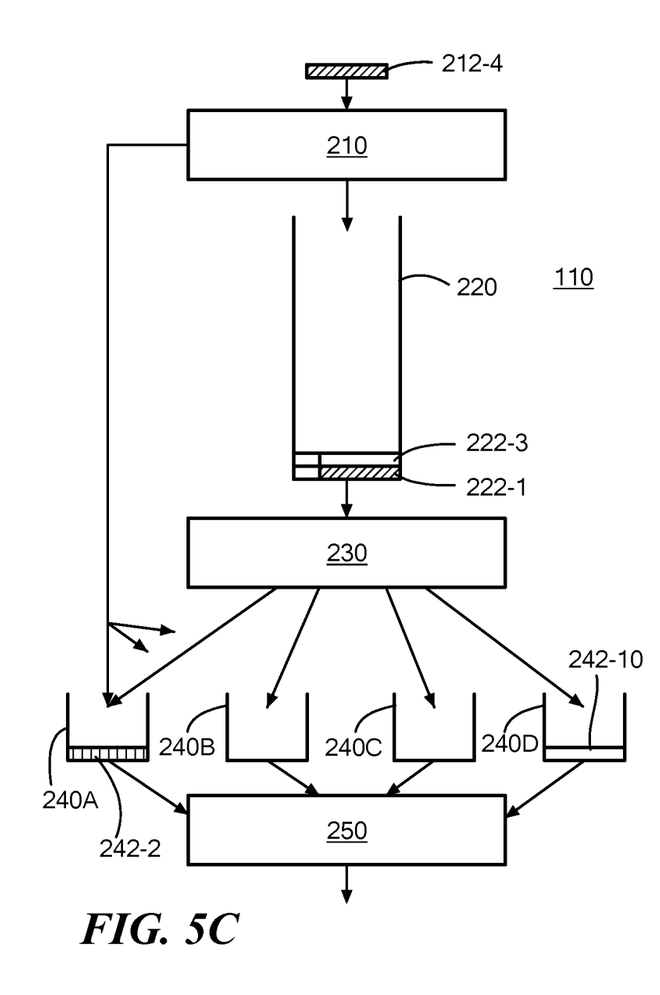
Figure 5D:
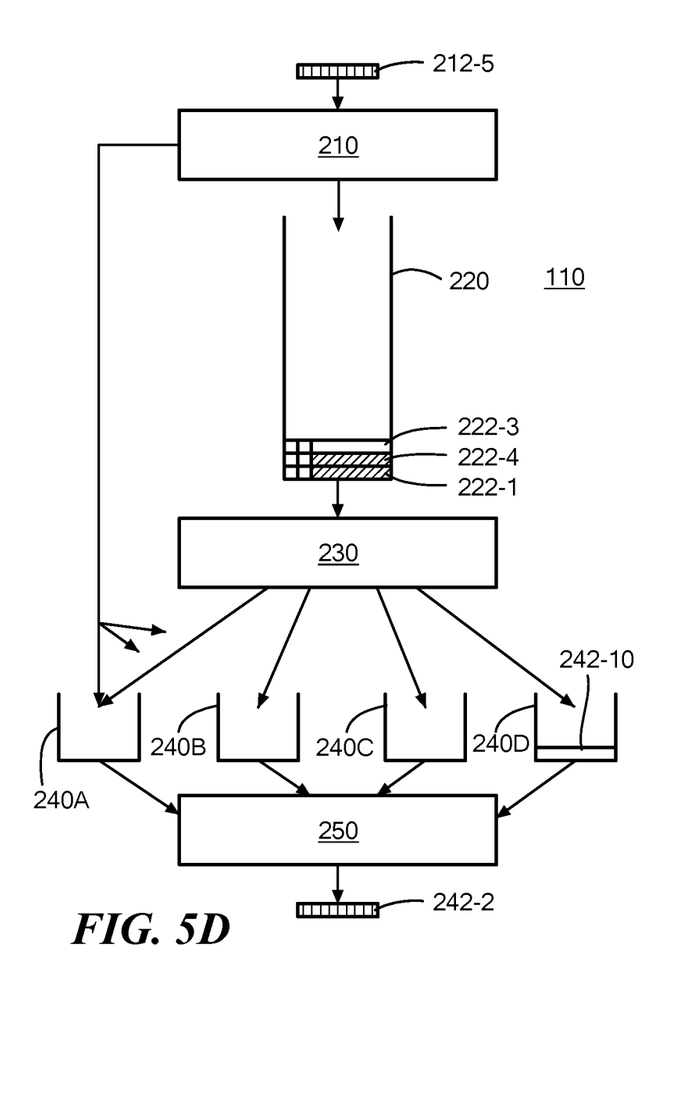
Figure 5E:
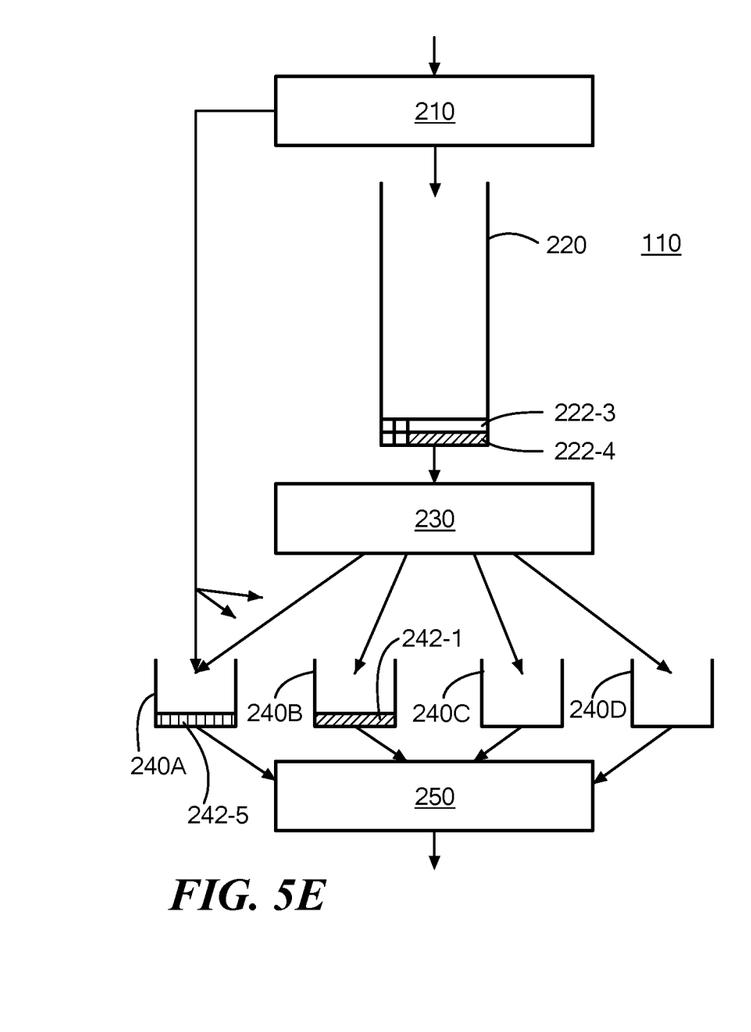
Figure 5F:
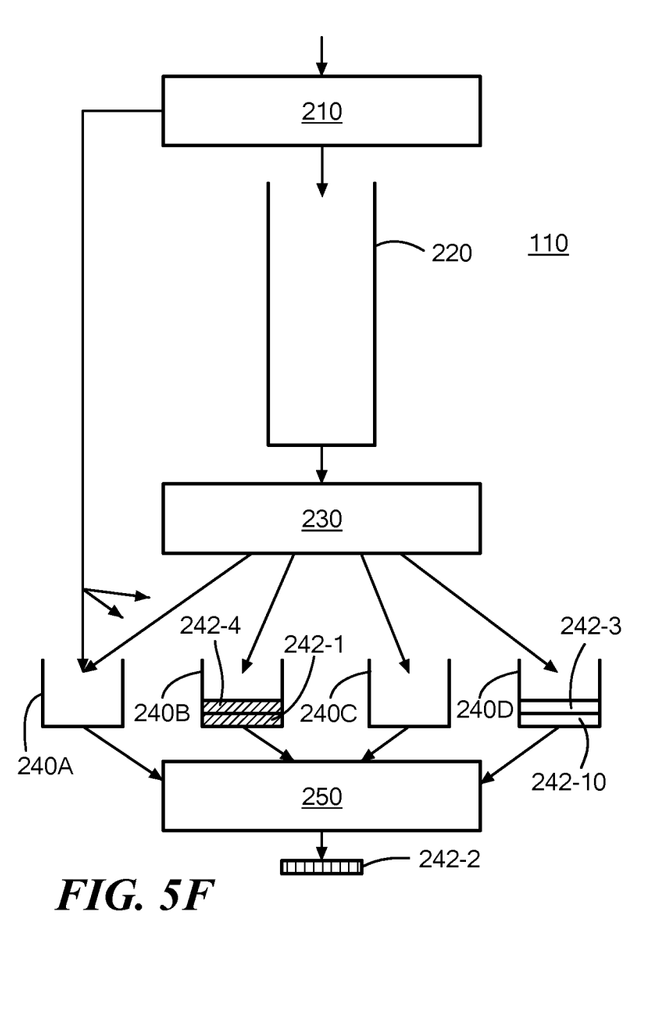
Figure 5G:
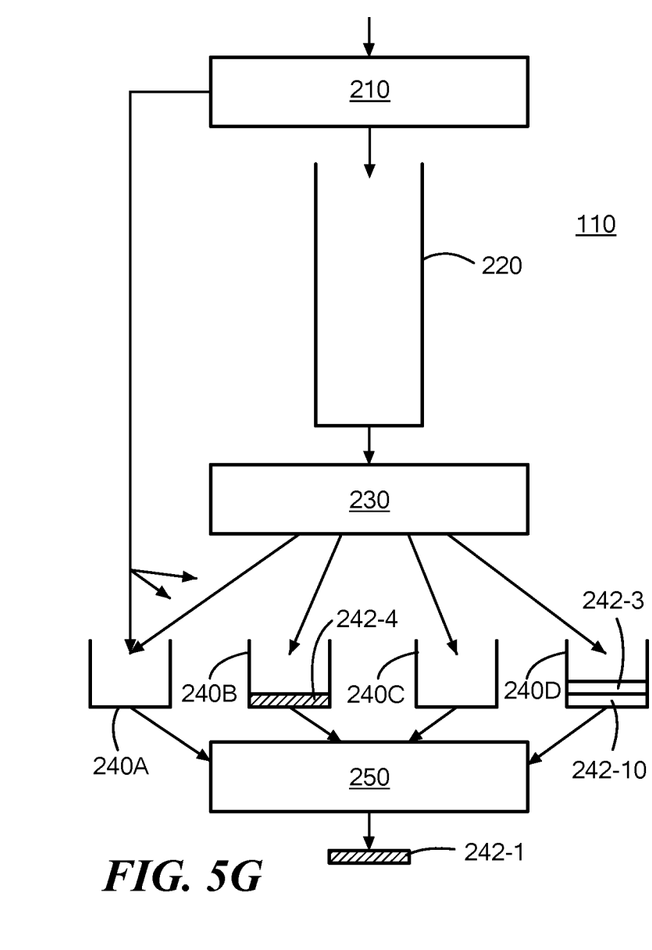
Figure 5H:
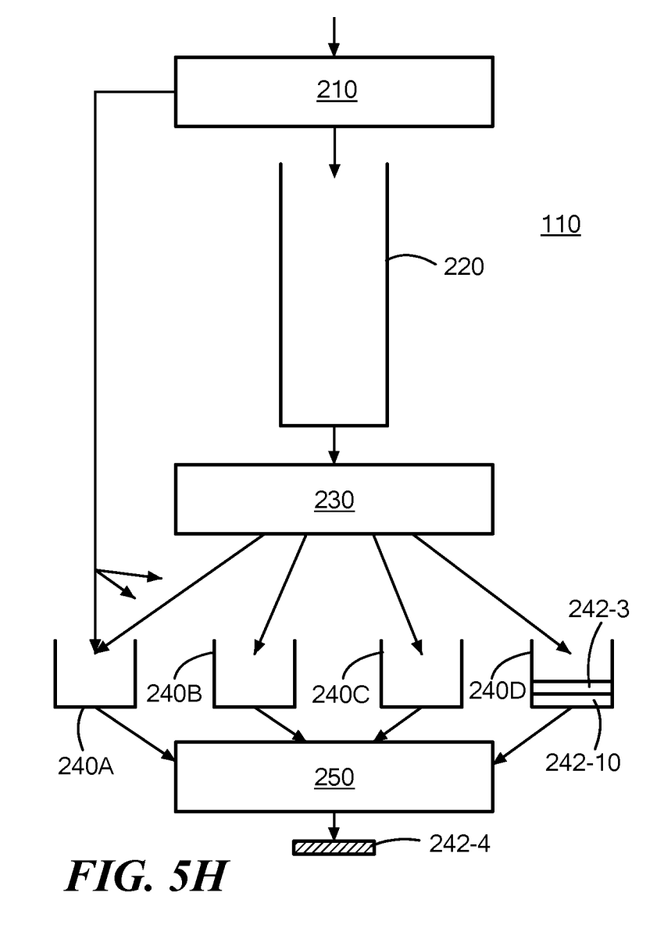

Referring to FIGS. 5A-H, operation of an embodiment corresponding to FIG. 2 is illustrated showing passage of a series of input events 212-1 through 212-5 through the event queue 110. Referring to FIG. 5A, events 242-0 and 242-10 are queued in queues 240C and 240D, respectively, and event 212-1 is about to be processed by the input processor 210. In FIG. 5B, the event 242-0 has been dequeued by the priority processor 250, and event 222-1, corresponding to input event 212-1 (i.e., including a delivery time field and a priority field in addition to the content of event 212-1), has been queued in the delay queue 220 after the input processor has determined that event 212-1 may be processed via a deferred path. The event 222-1 includes the delivery time computed by the input processor, and this the event 222-1 will remain in the delay queue 220 until that time has passed. Two new events, 212-2 and 212-3, are about to be processed by the input processor 210 in FIG. 5B. In FIG. 5C, input events 212-2 and 212-3 have been processed by the input processor 210. In this illustration, event 212-2 is determined by the input processor as requiring immediate processing, and therefore is queued in queue 240A (as event 242-2) via the direct path. On the other hand, the event 212-3 is queued as event 222-3 in the delay queue 220 because the input processor has determined that this event is suitable for deferred delivery, again with a delivery time indicated in the event 223-3. In this illustration, the delivery time of event 222-3 is later than that of event 222-1, and therefore event 222-3 is maintained later in the delay queue because it will be dequeued later. In FIG. 5C, an event 214-4 is illustrated as about to be processed by the input processor 210. In FIG. 5D, the event 242-2 is shown having been dequeue by the priority processor 250 and the input event 212-4 is shown queued as event 222-4 in the delay queue. In this illustration, the delivery time of event 222-4 is assumed to be after that of event 222-1 and before that of event 222-3, and therefore the events are 222-1. 222-4, and 222-3 are ordered according to their delivery times in the delay queue 220. In FIG. 5E, the delivery time of event 222-1 has passed, and the delay processor 230 has queued corresponding event 242-1 in queue 240B. The input processor 210 has also passed input event 212-5 directly to queue 240A as event 242-5, In FIG. 5F, the priority processor has dequeued event 242-5 and because the delivery time of both events 222-4 and 222-3 has passed, the delay processor has queued corresponding events 242-4 and 242-3 in queues 240B and 240D respectively. In FIG. 5G, the priority processor 250 has dequeued event 242-1 (i.e., the head event of the highest priority queue with pending events). In FIG. 5H, the priority processor 250 has dequeued event 242-4 leaving low priority events 242-10 and 242-3 for later dequeuing by the priority processor. It should be understood that in typically actual operation, far greater numbers of events are found in these queues, and the priority queues 240A-D will generally have multiple pending events.

Figure 6:
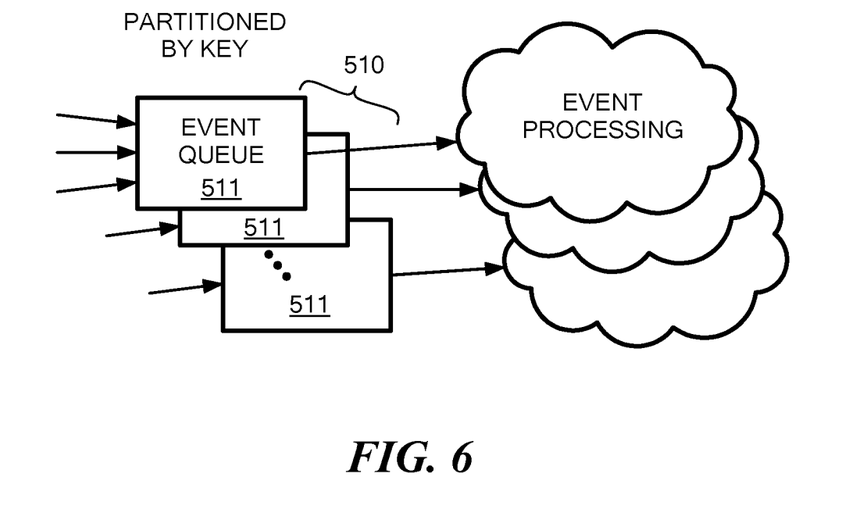
FIG. 6 is a diagram illustrating event data structures at various stages of processing in the event queue illustrated in FIG. 2.

The description above focusses on a single event queue 110. A distributed event queue 510 shown in FIG. 6. The distributed queue 510 includes a number of copies 511, each having the structure of the event queue 110 shown in FIG. 2. In this example, the events that are input to the distributed event queue are partitioned according to the key described above. In this way, if a class requires that the events for a particular value remain in order, that constraint can be applied separately at each event queue copy 511.

In an implementation, an implementation of the event queue 110 described above is used in conjunction with a system described in US Pat. Pub. 2016/0062776, "EXECUTING GRAPH-BASED PROGRAM SPECIFICATIONS," which is incorporated herein by reference. For example, the event queue 110 may be used to implement the "runnable queue" of tasks that may be executed, or may implement a link buffer, for example, for supporting a flow of an unordered collection. In some implementations, the event queue 110 forms a scheduling and prioritization function for a runtime system as described in the above-referenced publication whereby runnable tasks of different computation graphs are combined in a single event queue, and the prioritization and scheduling imposed by the event queue effectively allocates computation resources, in particular running instances of computations, according to the prioritization and scheduling. In this way, multiple graphs may coexist in a runtime system, with resources being preferentially applied to higher priority or more delay sensitive events, with other events consuming more "background" resources when available.

The approaches described above may be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

The instructions may be at different levels, including machine-language instructions, virtual machine instructions, higher-level programming instructions, and/or compiled or interpreted instructions. In some implementations, certain of the functions may be implemented fully or partially in special-purpose hardware. For example, various queues shown in FIG. 2 may have dedicated hardware, which may increase the efficiency or reduce the latency of the queuing approach that is implemented. Some implementations use a combination of software and special-purpose hardware components.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for processing multiple kinds of event messages in a computing system, the method including:
    storing received event messages in a data storage system, the data storage system including storage for a first plurality of records associated with event messages, where each event message includes a timestamp, and records associated with event messages include a field indicating a target delivery time for an event result for the event message, the target delivery time for at least some event messages being determined according to a kind of the event message; and
    processing the stored event messages to deliver event results based on information in the stored event messages and the target delivery times in the records associated with the event messages, the processing including:
        prioritizing event messages to deliver event results according to information stored in the event messages indicating priority,
        computing a target delivery time for each event message in a first set of one or more event messages that store information indicating a same priority for all of the event messages in the first set based on a fixed delay relative to its respective timestamp, and
        delivering event results for event messages that are deliverable based on a comparison of their target delivery times to a clock time.

2. The method of claim 1 wherein the processing further includes reordering a second set of event messages containing fewer than all of the stored event messages to process event messages in the second set of event messages according to the timestamps in the event messages instead of processing event messages in the second set of event messages according to an order in which those event messages were received.

3. The method of claim 2 wherein the target delivery time associated with a particular event message is computed after the particular event message is received using a function that is defined at least in part by information included in the particular event message.

4. The method of claim 3 wherein, for event messages associated with a first event class, the function returns a target delivery time that is based on the clock time.

5. The method of claim 4 wherein event messages associated with the first event class are not in the second set that is reordered, and are processed according to the order in which those event messages were received.

6. The method of claim 4 wherein, for event messages associated with a second event class of lower priority than the first event class, the function returns a target delivery time that is a sum of the fixed delay and a timestamp in the event message.

7. The method of claim 6 wherein event messages associated with the second event class are in the second set that is reordered, and are reordered according to timestamps stored in the event messages associated with the second class.

8. The method of claim 6 wherein, for event messages associated with a third event class of lower priority than the second event class, the function returns a target delivery time that is based on a timestamp stored in the event message.

9. The method of claim 8 wherein event messages associated with the third event class are in the second set that is reordered, and are reordered according to timestamps stored in the event messages associated with the third class.

10. The method of claim 6 wherein, for event messages associated with a third event class of lower priority than the second event class, the function returns a target delivery time that is based on a repeating schedule.

11. The method of claim 2 wherein the second set includes event messages that all include a common key value.

12. The method of claim 1 wherein prioritizing event messages to deliver event results according to information stored in the event messages includes storing event messages associated with event classes of different priorities in different respective ordered queues, and selecting a next event message to evaluate for potential delivery of an event result from a front of an ordered queue of a highest priority that is not empty.

13. The method of claim 1 wherein:
event messages of first set of one or more of the event messages are associated with a first event class with a first priority,
event messages of a second set of one or more of the event messages are associated with a second event class with a second priority, lower than the first priority, and
the computed target delivery time for each event message of the second set of one or more event messages is a sum of the fixed delay and a timestamp in the event message.

14. Software stored in a non-transitory form on a computer-readable medium, for processing event messages in a computing system, the software including instructions for causing the computing system to:
store received event messages in a data storage system, the data storage system including storage for a first plurality of records associated with event messages, where each event message includes a timestamp, and records associated with event messages include a field indicating a target delivery time for an event result for the event message, the target delivery time for at least some event messages being determined according to a kind of the event message; and
process the stored event messages to deliver event results based on information in the stored event messages and the target delivery times associated with the event messages, the processing including:
prioritizing event messages to deliver event results according to information stored in the event messages indicating priority,
computing a target delivery time for each event message in a first set of one or more event messages that store information indicating a same priority for all of the event messages in the first set based on a fixed delay relative to its respective timestamp, and
delivering event results for event messages that are deliverable based on a comparison of their target delivery times to a clock time.

15. A computing system for processing event messages, the computing system including:
a data storage system for storing received event messages, the data storage system including storage for a first plurality of records associated with event messages, where each event message includes a timestamp, and records associated with event messages include a field indicating a target delivery time for an event result for the event message, the target delivery time for at least some event messages being determined according to a kind of the event message; and
at least one processor configured to process the stored event messages to deliver event results based on information in the stored event messages and the target delivery times associated with the event messages, the processing including:
prioritizing event messages to deliver event results according to information stored in the event messages indicating priority,
computing a target delivery time for each event message in a first set of one or more event messages that store information indicating a same priority for all of the event messages in the first set based on a fixed delay relative to its respective timestamp, and
delivering event results for event messages that are deliverable based on a comparison of their target delivery times to a clock time.

16. A computing system for processing event messages, the computing system including:
means for storing received event messages and storing a first plurality of records associated with event messages, where each event message includes a timestamp, and records associated with event messages include a field indicating a target delivery time for an event result for the event message, the target delivery time for at least some event messages being determined according to a kind of the event message; and
means for processing the stored event messages to deliver event results based on information in the stored event messages and the target delivery times associated with the event messages, the processing including:
prioritizing event messages to deliver event results according to information stored in the event messages indicating priority,
computing a target delivery time for each event message in a first set of one or more event messages that store information indicating a same priority for all of the event messages in the first set based on a fixed delay relative to its respective timestamp, and
delivering event results for event messages that are deliverable based on a comparison of their target delivery times to a clock time.

* * * * *